(12) United States Patent
Bottini et al.

(10) Patent No.: US 11,104,521 B2
(45) Date of Patent: Aug. 31, 2021

(54) APPARATUS FOR TRANSPORTING AGGREGATES OR SIMILAR

(71) Applicant: BM GROUP HOLDING S.p.A., Borgo Chiese (IT)

(72) Inventors: Mirko Bottini, Borgo Chiese (IT); Andrea Tonini, Storo (IT); Michael Corradi, Daone (IT)

(73) Assignee: BM GROUP HOLDING S.P.A., Borgo Chiese (IT)

( * ) Notice: Subject to any disclaimer, the term of this patent is extended or adjusted under 35 U.S.C. 154(b) by 0 days.

(21) Appl. No.: 16/802,994

(22) Filed: Feb. 27, 2020

(65) Prior Publication Data
US 2020/0277143 A1 Sep. 3, 2020

(30) Foreign Application Priority Data
Mar. 1, 2019 (IT) .................. 102019000003025

(51) Int. Cl.
*B65G 43/02* (2006.01)
*B65G 15/08* (2006.01)
*B65G 39/12* (2006.01)

(52) U.S. Cl.
CPC ............. *B65G 43/02* (2013.01); *B65G 15/08* (2013.01); *B65G 39/12* (2013.01);
(Continued)

(58) Field of Classification Search
CPC ........ B65G 43/02; B65G 15/08; B65G 39/12; B65G 43/08; B65G 2203/0291; B65G 2207/22; B65G 2201/042; B65G 2203/045
(Continued)

(56) References Cited

U.S. PATENT DOCUMENTS 5,628,409 A * 5/1997 Thomas ............... B07C 5/126
                                               209/577
6,112,903 A * 9/2000 Kimmel ................ G01N 22/00
                                               198/461.2
(Continued)

FOREIGN PATENT DOCUMENTS

DE    3131963   *  2/1983  ............. B65G 43/02
DE    4203708   *  8/1993  ............. B65G 43/00
(Continued)

OTHER PUBLICATIONS

Italian Search Report dated Nov. 11, 2019, from Italian Application No. 201900003025.

*Primary Examiner* — James R Bidwell
(74) *Attorney, Agent, or Firm* — Innovation Capital Law Group, LLP; Vic Lin

(57) ABSTRACT

An apparatus for transporting aggregates or similar includes a conveyor belt for aggregates or similar and an actuating mechanism actuating advancement of the conveyor belt. The apparatus includes a plurality of thermal cameras positioned along the development of the conveyor belt and configured to detect the temperature of the conveyor belt in a plurality of detection positions positioned along the development of the conveyor belt. The apparatus further includes a processing and control unit communicating data with each one of thermal cameras of the plurality of thermal cameras to receive input temperature data detected by each thermal camera. The processing and control unit is configured to estimate the extent and origin position of an overheating phenomenon of the conveyor belt on the basis of the temperature detected in correspondence of at least two detection positions of the plurality of detection positions.

11 Claims, 4 Drawing Sheets

(52) U.S. Cl.
CPC ............... *B65G 2201/042* (2013.01); *B65G 2203/0291* (2013.01); *B65G 2203/045* (2013.01); *B65G 2207/22* (2013.01)

(58) Field of Classification Search
USPC ...................................... 198/502.1
See application file for complete search history.

(56) References Cited

U.S. PATENT DOCUMENTS

| | | | |
|---|---|---|---|
| 8,701,873 B2 * | 4/2014 | Kuesel ............... | E21F 9/00 198/810.01 |
| 2015/0151917 A1 * | 6/2015 | Campbell ............ | B23P 6/00 198/824 |
| 2016/0314573 A1 * | 10/2016 | Salisbury ............ | G01J 5/089 |

FOREIGN PATENT DOCUMENTS

| | | |
|---|---|---|
| DE | 102016107513 A1 | 10/2016 |
| JP | H09210796 A | 8/1997 |
| JP | 2018127333 A | 8/2018 |
| WO | 2015009467 A1 | 1/2015 |
| WO | 2015035445 A1 | 3/2015 |

* cited by examiner

APPARATUS FOR TRANSPORTING AGGREGATES OR SIMILAR

TECHNICAL FIELD

The present invention relates to an apparatus for transporting aggregates or similar provided with a fire prevention system, and to a method for the prevention of fires in such an apparatus.

BACKGROUND OF THE INVENTION

Currently, rubber conveyor belts, for example vulcanized rubber, are generally used to transport aggregates, and in particular minerals, inside quarries, in mines, inside plants for processing minerals or even in industrial ports that are activated by special actuating means and slide on crowns of idle rollers positioned along the development of the belt itself.

These conveyor belts can be applied on the ground, in a fixed way, or they can also be part of partly mobile transport machines, such as the so-called "stacker reclaimer", or they can also be provided on board ships and/or in plants for harbour unloaders.

Depending on the sector of use, the conveyor belts can also reach lengths of several hundred meters.

Such conveyor belts are generally used for transporting aggregates or similar, among which non-combustible but also combustible materials, or even self-combustive materials of various solid nature can be included.

The movement of the conveyor belt, also given the significant weight of the aggregates it carries, involves high friction between the rubber belt and all the components used for its support, such as, first of all, the idle rollers above, against which the conveyor belt rubs during movement.

Therefore, the localized increase in friction, due for example to a blockage of one of the idle rollers supporting the belt, is sufficient to cause significant increases in temperature of the belt, which can lead to damage to the belt and also to the formation of fires.

The damage to the rubber belt that derives from excessive overheating and/or a fire imposes a prolonged downtime of the transport apparatus, and consequently of the whole system in which it is used, as it is necessary to unload the transport material from the belt to be able to repair this belt or even replace it if localized repair is not possible.

Furthermore, any eventual belt repair intervention is further complicated by the fact that the conveyor belt is often used in areas that are difficult to be reached with operating maintenance means.

To try to prevent the formation of fires, the apparatuses for transporting aggregates of the known type are sometimes equipped with heat sensors made up for example of heat-sensitive cables associated with the support structure of the conveyor belt which, upon reaching a pre-set temperature, activate alarms and/or stop the conveyor belt and/or activate fire-extinguishing systems with which the apparatus is possibly equipped.

In some cases, the heat sensors can be made up of thermosensitive optical fibers which flank the conveyor belt along the development thereof. Also in this case temperature rises above the threshold detected by the optical fiber activate alarms, and/or stop the conveyor belt and/or activate fire-extinguishing systems.

These apparatuses for transporting aggregates of the known type, with particular reference to the problem of preventing fires, are not, however, free from drawbacks, including the fact that they do not allow to trace the cause of the overheating of the conveyor belt and therefore they do not allow to intervene locally to prevent, or at least timely extinguish, the fire in order to immediately restore the correct operation of the conveyor belt and therefore reduce, if not even zero, downtime.

SUMMARY OF THE INVENTION

The main object of the present invention is to realise an apparatus for transporting aggregates which solves the above-mentioned technical problem, making it possible to prevent the formation of fires.

Within the scope of this task, an object of the present invention is to realise an apparatus for transporting aggregates which allows to identify the cause of the overheating of the conveyor belt in order to be able to intervene locally and immediately so as to restore the correct operation of the belt of transport by limiting, or even nullifying, downtime.

A further object of the invention consists of realising an apparatus for transporting aggregates that can provide the widest reliability and safety guarantees during use.

Another object of the invention consists of realising an apparatus for transporting aggregates that is easy to manufacture and economically competitive in its use, if compared to the prior art.

The task set forth above, as well as the mentioned objects and others which will become more apparent hereinafter, are achieved by an apparatus for transporting aggregates or similar as set forth in claim 1.

The task set forth above, as well as the mentioned objects and others which will become more apparent hereinafter, are also achieved by a method for the prevention of fires in an apparatus for transporting aggregates or similar as set forth in claim 6.

Other features are comprised in the dependent claims.

Additional features and advantages will become more apparent from the description of a preferred, but non-exclusive, embodiment of an apparatus for transporting aggregates or similar, illustrated by way of non-limiting example.

Figure 1:
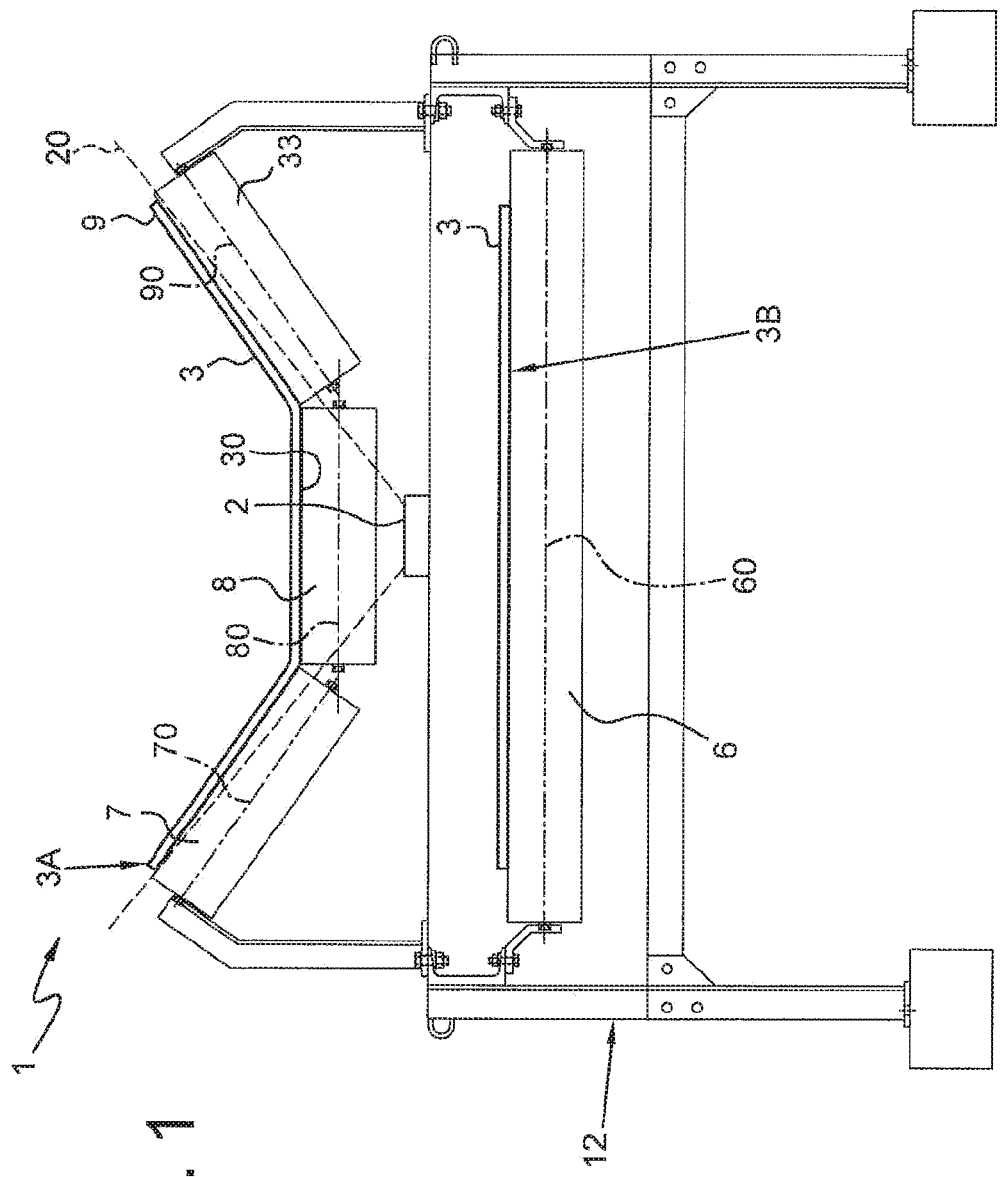
FIG. 1 is a partial front elevation view of an embodiment of an apparatus for transporting aggregates or similar, according to the invention.

With reference to the aforementioned figures, the apparatus for transporting aggregates or similar, indicated globally by the reference number 1, comprises a conveyor belt 3 for aggregates or similar and actuating means 5 actuating advancement of the conveyor belt 3.

DETAILED DESCRIPTION OF THE PREFERRED EMBODIMENTS

According to the invention, the apparatus 1 comprises a plurality of thermal cameras 2 positioned along the development of the conveyor belt 3 and configured to detect the temperature of the conveyor belt 3 in a plurality of detection positions A, B, C, D positioned along the development of the conveyor belt 3. Always according to the invention, the apparatus 1 comprises a processing and control unit 4 communicating data with each one of thermal cameras 2 of said plurality of thermal cameras 2 to receive input temperature data detected by each thermal camera 2. The processing and control unit 4 is also configured to estimate the extent and origin position of an overheating phenomenon of the conveyor belt 3 on the basis of the temperature detected in correspondence of at least two detection positions A, B, C, D of said plurality of detection positions A, B, C, D.

Advantageously, the processing and control unit 4 is configured to estimate origin position of an overheating phenomenon of the conveyor belt 3 also on the basis of advancing speed of the belt 3 as well as on the basis of the temperature of the belt 3 detected in the aforementioned at least two detection positions A, B, C, D.

Advantageously, the processing and control unit 4 is configured to control the actuating means 5 of the conveyor belt 3 so as to intervene on the advancement of the conveyor belt 3 as a function of the extent of the overheating phenomenon that has been estimated.

The actuating means 5 of the conveyor belt 3 can comprise a motor element, preferably an electric one, preferably controlled by a gradual speed starter.

In particular, the processing and control unit 4 can impose a stop of the actuating means 5 and therefore a stop of the actuation of the belt 3, or it can intervene on the actuating means 5 to vary the advancing speed of the belt 3, for example by slowing it down. In this way, for example, it is also possible to try to reduce the localized overheating of the conveyor belt 3 without completely interrupting its operation until the temperature returns within a predetermined safety threshold.

Advantageously, the conveyor belt 3 comprises at least a first portion 3A suitable for conveying the aggregates or similar, while the apparatus 1 comprises a plurality of rollers 7, 8, 9 configured to support said first portion 3A of the conveyor belt 3 during its advancement. Said first portion 3A of the conveyor belt 3 comprises a lower surface 30 resting on said rollers 7, 8, 9. The thermal cameras 2 are advantageously positioned below this first portion 3A of the conveyor belt 3 to detect the temperature of the lower surface 30 of said first portion 3A of the conveyor belt 3.

In fact the overheating of the conveyor belt 3 often originates from the friction that occurs during the advancement of the belt 3 itself, loaded with material to be conveyed, on the rollers 7, 8, 9 supporting the belt 3.

The thermal cameras 2 can advantageously be positioned above the conveyor belt 3, so as to detect, from above, the temperature of the conveyor belt 3 and therefore the temperature of the material which is conveyed by the conveyor belt 3.

The apparatus 1 can comprise thermal cameras 2 positioned both above and below the conveyor belt 3 in different detection positions A, B, C, D.

Advantageously, the thermal cameras 2 can also be positioned on the sides of the conveyor belt 3 and in any case in one or more different positions at 360° around the conveyor belt.

Advantageously, the thermal cameras 2 are configured to detect the temperature of the conveyor belt 3 in the detection positions A, B, C, D at the entire transverse width of the conveyor belt 3.

Advantageously, the apparatus 1 can comprise, in one or more of the detection positions A, B, C, D, a plurality of thermal cameras 2.

Advantageously, the apparatus 1 can comprise, in each of the detection positions A, B, C, D, a plurality of thermal cameras 2.

Figure 5:
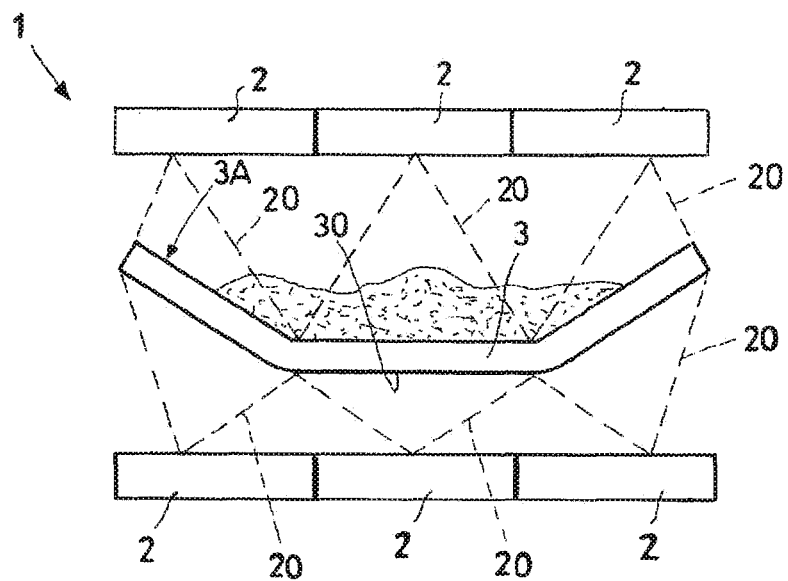

As illustrated in FIG. 5, a plurality of thermal cameras 2 can be provided, capable of detecting the overall temperature of the conveyor belt 3 in the detection positions A, B, C, D at the entire transverse width of the conveyor belt 3.

These thermal cameras 2 can be provided below the conveyor belt 3, and in particular below its portion 3A, or above the conveyor belt 3, or also both below and above the conveyor belt 3.

For example, two or more thermal cameras 2 can be provided, side by side in a direction transverse to the direction of development of the conveyor belt 3, where each thermal camera 2 is adapted to detect the temperature of a corresponding portion of the conveyor belt 3. In the example of FIG. 5, the dashed lines 20 show the visuals of three thermal cameras 2 capable of detecting the overall temperature of the conveyor belt 3 at the entire transverse width of the same.

Figure 2:
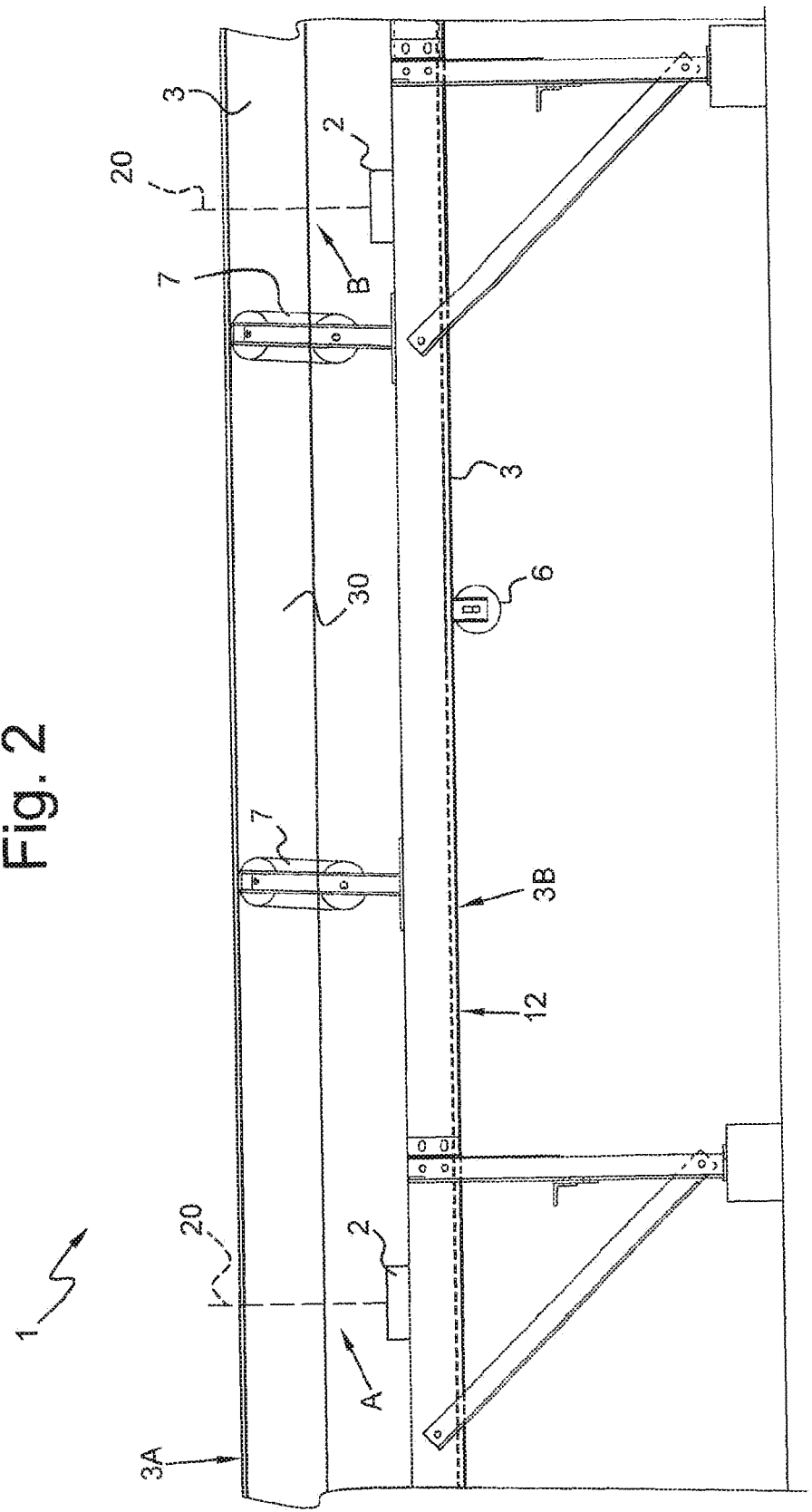
FIG. 2 is a side elevation view of the apparatus for transporting aggregates or similar illustrated in FIG. 1, according to the invention.
Figure 3:
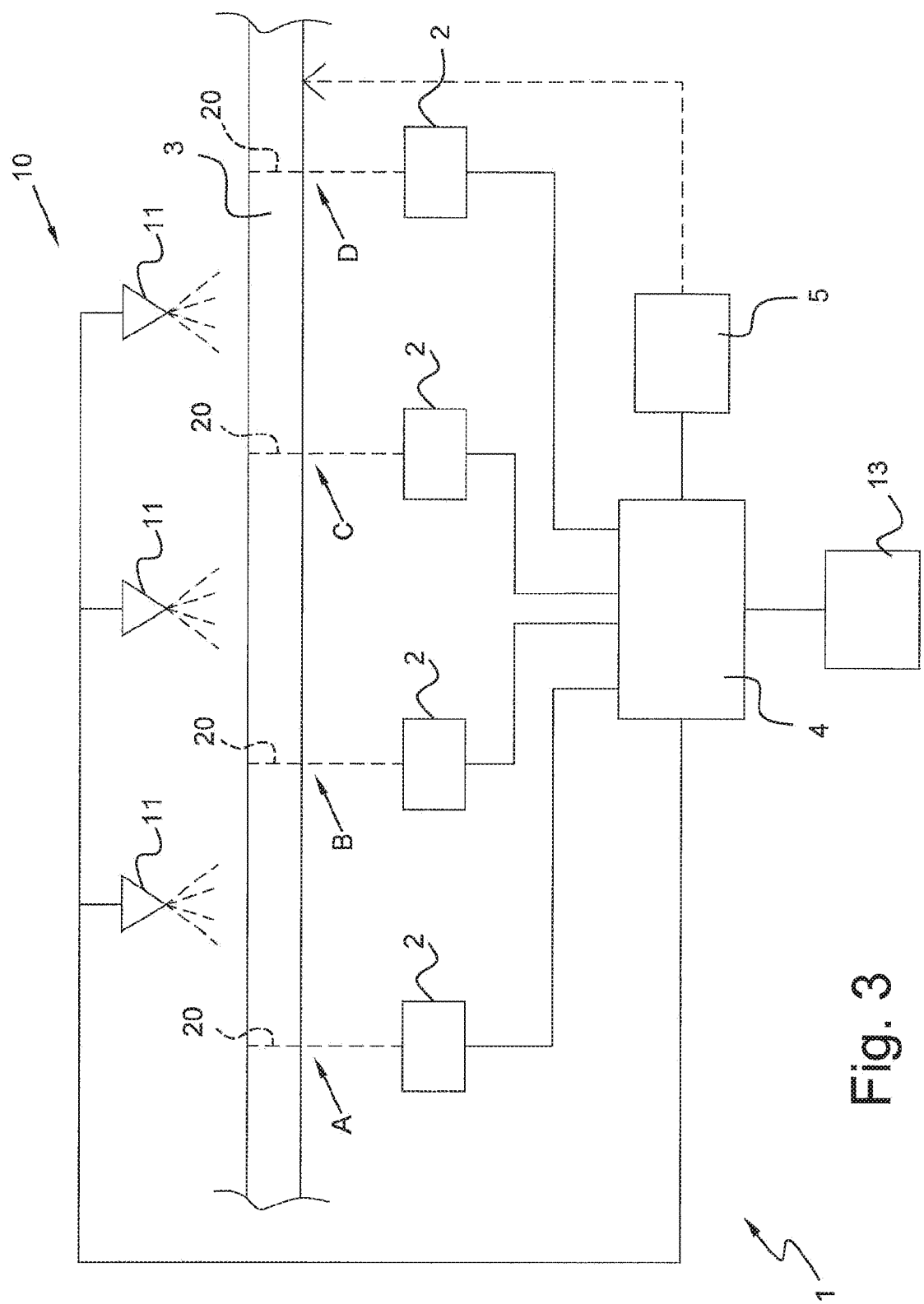
FIG. 3 illustrates an operating diagram of the apparatus for transporting aggregates or similar, according to the invention.

As illustrated in FIGS. 1 and 2, and as explained above, the conveyor belt 3 has a first portion 3A, or forward portion, used for transporting aggregates, which advances supported by spaced apart crowns of idle rollers 7, 8, 9.

Said crowns of rollers can comprise three rollers 7, 8, 9 placed side by side, where the central roller 8 is arranged with its own axis of rotation 80 horizontally, while the rollers 7, 9 lateral thereto are arranged with its own axis of rotation 70, 90 inclined so as to form a concave, reservoir-shaped support structure as a whole.

This concave shape assumed by the conveyor belt 3 due to the arrangement of the three support rollers 7, 8, 9 allows preventing the loss of conveyed material due to lateral sliding outside the lateral edges of the conveyor belt 3 itself.

The possibility of having thermal cameras 2 capable of detecting a temperature profile along the entire transverse width of the belt 3 allows detecting any localized overheating phenomena affecting only a part of the conveyor belt 3, for example the central band only, at the central roller 8, or a single lateral band, at one of the two lateral rollers 7, 9.

In fact, the overheating of the conveyor belt 3 is often caused precisely by the blockage of one of the support rollers 7, 8, 9 and the consequent rubbing between the blocked roller and the belt.

Having estimated the extent and the origin position of the heating phenomenon, the possibility of detecting an increase in temperature localized on a specific band of the conveyor belt 3 therefore also allows to possibly trace back the specific support roller which, for the most varied reasons, causes an increase in friction with the belt.

As illustrated in FIGS. 1 and 2, the conveyor belt 3 also comprises a second portion 3B, or return portion, which advances in the opposite direction with respect to the first portion 3A. This second portion 3B of the conveyor belt 3 is supported by further support rollers 6 having a horizontal rotation axis 60.

The apparatus 1 advantageously comprises a frame 12 with which all the rollers 6, 7, 8, 9 supporting the conveyor belt 3 are associated. Both the rollers 7, 8, 9 supporting the forward portion 3A of the conveyor belt 3 and the rollers 6 supporting the return portion 3B of the conveyor belt 3 can be positioned along the development of the conveyor belt 3, at a mutual distance which is a function of the size and capacity of the conveyor belt 3 itself.

Advantageously also the thermal cameras 2 can be associated with the frame 12, preferably so as to be able to directly frame the lower surface 30 of the portion 3A of the conveyor belt 3 which is assigned to the effective transport of the aggregates, as schematically illustrated in FIG. 1, where the view of the thermal camera 2 is indicated with a dashed line 20.

Advantageously, the thermal cameras 2 can be positioned below the return portion 3B of the conveyor belt 3.

Advantageously, the thermal cameras 2 can be of the type of infrared thermal cameras.

The thermal cameras 2 are advantageously apparatuses adapted to detect the infrared energy emitted by the conveyor belt 3 and convert it into an electronic signal which is subsequently processed by the processing and control unit 4 for estimating the extent and origin position of the overheating phenomenon affecting the conveyor belt 3.

The thermal cameras 2 can be ready-to-use commercial apparatuses, or, in general, detection apparatuses composed of sensors capable of making temperature measurements, such as thermal, radiometric sensors, suitably combined with a dedicated control electronics.

Advantageously, the electronic signal can also be sent to a display 13 so as to produce a so-called thermal image of what has been framed by the thermal camera 2 itself.

Advantageously, the apparatus 1 also comprises an antifire system 10 comprising a plurality of delivery devices 11 of a cooling liquid and/or a fire-extinguishing liquid positioned along the development of the conveyor belt 3. The processing and control unit 4 is configured to control the activation of these delivery devices 11 as a function of the extent and origin position of the overheating phenomenon, so as to be able to intervene directly on the heat source, to promptly lower the temperature thereof and/or to put out a possible fire immediately.

Advantageously, each thermal camera 2 comprises a protective case. Advantageously, this protective case is adapted to thermally protect the thermal camera 2. Advantageously, the protective case is also adapted to protect the thermal camera 2 from dust.

Advantageously, the thermal camera 2, or possibly the protective case which contains it, is fixed to the frame 12 of the apparatus 1 by means of anti-vibration supports.

Figure 4:
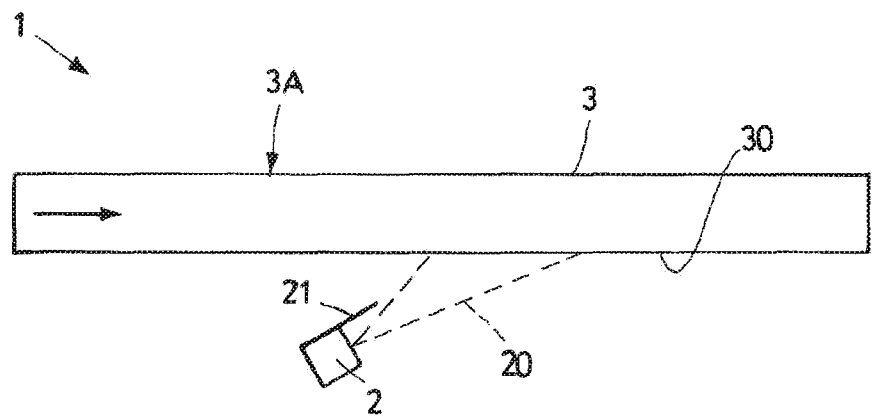
FIGS. 4 and 5 schematically show, respectively in a side view and in a front view, variants of the apparatus for transporting aggregates or similar, according to the invention.

As illustrated in FIG. 4, as an alternative to the protective case, each thermal camera 2 can comprise a covering element 21 adapted to protect the thermal camera 2 from external agents.

Advantageously, the thermal camera 2 comprises an optics made of germanium glass.

The present invention also relates to a method for preventing fires in an apparatus 1 for transporting aggregates or similar comprising a conveyor belt 3 for aggregates or similar and actuating means 5 actuating the advancement of the conveyor belt 3, where this apparatus 1 also comprises a plurality of thermal cameras 2 positioned along the development of the conveyor belt 3 and configured to detect the temperature of the conveyor belt 3 in a plurality of detection positions A, B, C, D positioned along this development of the belt 3.

According to the invention, the method for preventing fires comprises a step of detecting the temperature of the conveyor belt 3 in this plurality of detection positions A, B, C, D and a step of estimating the extent and origin position of an overheating phenomenon of the conveyor belt 3 on the basis of the temperature detected at at least two detection positions A, B, C, D.

Advantageously, the method for preventing fires also comprises the step of controlling the actuating means 5 of the conveyor belt 3 in order to intervene on the advancement of the conveyor belt 3 as a function of the extent of the overheating phenomenon detected on the conveyor belt 3.

Advantageously, the step of estimating the extent and origin position of the overheating phenomenon of the conveyor belt 3 is carried out on the basis of the temperature detected in at least two detection positions A, B, C, D and on the basis of the advancing speed of the conveyor belt 3.

Advantageously, the step of controlling the actuating means 5 comprises the step of stopping the advancement of the conveyor belt 3 or the step of varying the advancing speed of the conveyor belt 3.

Advantageously, the step of detecting the temperature of the conveyor belt 3 in the plurality of detection positions A, B, C, D comprises the step of detecting the temperature of the conveyor belt 3 at the entire transverse width of the conveyor belt 3 for detecting any localised temperature increases in one or more transverse positions along the transverse width of the conveyor belt 3.

Advantageously, the thermal cameras 2 detect the temperature of the conveyor belt 3 continuously.

Advantageously, in the step of estimating the extent and origin position of the overheating phenomenon of the conveyor belt 3, the thermal mass of the conveyor belt 3 itself is also taken into account.

In practice, it has been found that the apparatus for transporting aggregates and the method for the prevention of fires in such an apparatus, according to the present invention, fulfil the intended aim and objects as they allow to monitor the temperature with positioned thermal cameras of the conveyor belt during its operation in order to estimate the extent and the origin position of the overheating phenomenon, thus being able to intervene immediately to stop this overheating and prevent fires.

In particular, an advantage of the apparatus and of the method, according to the invention, consists in the fact that the possibility of correlating the various temperature data detected in different detection positions both along the development of the conveyor belt and transversely to this development allows to accurately estimate not only the extent of the overheating but also the origin position of said overheating. By then knowing this entity and this position, it is possible to intervene locally in a targeted manner.

An advantage of the apparatus and of the method, according to the invention, therefore consists in being able to also predict a possible overheating phenomenon of the conveyor belt, being able to decide when to intervene to bring the conveyor belt back to the optimum temperature conditions. In fact, the invention allows detecting and monitoring even small temperature differences between different positions of the belt, and predicting the subsequent evolution of the overheating phenomenon.

Indeed, by monitoring the temperature variation gradient of the conveyor belt, it is also possible to establish whether the overheating phenomenon is destined to increase, or whether it is returning to normality.

The apparatus for transporting aggregates and the fire prevention method related to it and thus conceived are susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. An apparatus (1) for transporting aggregates comprising a conveyor belt (3) for aggregates and actuating means (5) actuating advancement of said conveyor belt (3), characterized in that it comprises a plurality of thermal cameras (2) positioned along the development of said conveyor belt (3) and configured to detect the temperature of said conveyor belt (3) in a plurality of detection positions (A, B, C, D) positioned along said development of the conveyor belt (3), said apparatus (1) further comprising a processing and control unit (4) communicating data with each one of said thermal cameras (2) of said plurality of thermal cameras (2) to receive input temperature data detected by each thermal camera (2), said processing and control unit (4) being configured to estimate the extent and origin position of an overheating phenomenon of said conveyor belt (3) on the basis of a temperature detected in correspondence of at least two detection positions (A, B, C, D) of said plurality of detection positions (A, B, C, D).

2. The apparatus (1) according to claim 1, characterized in that said processing and control unit (4) is configured to control said actuating means (5) of said conveyor belt (3) so as to intervene on the advancement of said conveyor belt (3) as a function of said extent of said overheating phenomenon.

3. The apparatus (1) according to claim 1, characterized in that said conveyor belt (3) comprises at least a first portion (3A) suitable for conveying said aggregates, said apparatus (1) comprising a plurality of rollers (7, 8, 9) configured to support said first portion (3A) of said conveyor belt (3) during its advancement, said first portion (3A) of said conveyor belt (3) comprising a lower surface (30) resting on said rollers (7, 8, 9), said thermal cameras (2) being positioned below said first portion (3A) of said conveyor belt (3) to detect the temperature of said lower surface (30) of said first portion (3A) of said conveyor belt (3).

4. The apparatus (1) according to claim 1, characterized in that said thermal cameras (2) are configured to detect the temperature of said conveyor belt (3) in said detection positions (A, B, C, D) at the entire transverse width of said conveyor belt (3).

5. The apparatus (1) according to claim 1, characterized in that it comprises an anti-fire system (10) comprising a plurality of delivery devices (11) of a fire-extinguishing liquid positioned along said development of said conveyor belt (3), said processing and control unit (4) being configured to control the activation of said delivery devices (11) as a function of said extent and of said origin position of said overheating phenomenon.

6. The apparatus (1), according to claim 1, characterized in that said thermal cameras (2) are positioned above said conveyor belt (3) to detect the temperature of said conveyor belt (30) and aggregates transported by said conveyor belt (30) from above.

7. A method for the prevention of fires in an apparatus (1) for transporting aggregates, comprising a conveyor belt (3) for aggregates and actuating means (5) actuating advancement of said conveyor belt (3), said apparatus (1) further comprising a plurality of thermal cameras (2) positioned along the development of said conveyor belt (3) and configured to measure the temperature of said conveyor belt (3) in a plurality of detection positions (A, B, C, D) positioned along said development of said conveyor belt (3), said method being characterized in that it comprises a step of detecting said temperature of said conveyor belt (3) in said plurality of detection positions (A, B, C, D) and a step of estimating the extent and the origin position of an overheating phenomenon of said conveyor belt (3) on the basis of the temperature measured at at least two detection positions (A, B, C, D) of said plurality of detection positions (A, B, C, D).

8. The method according to claim 7, characterized in that it comprises the step of controlling said actuating means (5) of said conveyor belt (3) so as to intervene on the advancement of said conveyor belt (3) on the basis of said extent of said overheating phenomenon of said conveyor belt (3).

9. The method according to claim 7, characterized in that said step of estimating the extent and the origin position of said overheating phenomenon of said conveyor belt (3) is carried out on the basis of said temperature measured at said at least two detection positions (A, B, C, D) and on the basis of the advancing speed of said conveyor belt (3).

10. The method according to claim 8, characterized in that said step of controlling said actuating means (5) comprises the step of stopping said advancement of said conveyor belt (3) or the step of changing the advancing speed of said conveyor belt (3).

11. The method according to claim 7, characterized in that said step of detecting said temperature of said conveyor belt (3) in said plurality of detection positions (A, B, C, D) comprises the step of detecting the temperature of said conveyor belt (3) in correspondence with the whole transverse width of said conveyor belt (3) for detecting possible temperature increases located in one or more transverse positions along said transversal width of said conveyor belt (3).

* * * * *